United States Patent
Christiansen et al.

(10) Patent No.: US 12,151,220 B2
(45) Date of Patent: Nov. 26, 2024

(54) VERTICAL MOTION MIXING DRIVE

(71) Applicant: Ovivo Inc., Montreal (CA)

(72) Inventors: Haydon Christiansen, Sandy, UT (US); James Goldhardt, Layton, UT (US); Jacob Harwood, North Salt Lake, UT (US)

(73) Assignee: Ovivo Inc., Montreal (CA)

( * ) Notice: Subject to any disclaimer, the term of this patent is extended or adjusted under 35 U.S.C. 154(b) by 347 days.

(21) Appl. No.: 17/207,156

(22) Filed: Mar. 19, 2021

(65) Prior Publication Data
US 2022/0297069 A1    Sep. 22, 2022

(51) Int. Cl.
*B01F 31/00* (2022.01)
*B01F 31/441* (2022.01)
*B01F 35/32* (2022.01)
B01F 35/30 (2022.01)
B01F 101/00 (2022.01)

(52) U.S. Cl.
CPC ............ *B01F 31/70* (2022.01); *B01F 31/441* (2022.01); *B01F 35/3204* (2022.01); *B01F 35/323* (2022.01); *B01F 35/325* (2022.01); *B01F 2035/352* (2022.01); *B01F 2101/305* (2022.01)

(58) Field of Classification Search
CPC .. B01F 31/70; B01F 31/441; B01F 2101/305; B01F 35/325
See application file for complete search history.

(56) References Cited

U.S. PATENT DOCUMENTS

| | | | | |
|---|---|---|---|---|
| 945,639 | A * | 1/1910 | Taylor | F16H 21/36 74/50 |
| 1,261,545 | A * | 4/1918 | Johnson | D06F 13/04 366/256 |
| 1,268,592 | A * | 6/1918 | McLaughlin | B01F 31/441 366/332 |
| 4,198,373 | A * | 4/1980 | Kropp | B01F 35/4111 422/135 |
| 5,813,760 | A * | 9/1998 | Strong | B01F 31/441 366/605 |
| 6,830,369 | B2 | 12/2004 | Haughton et al. | |
| 7,399,112 | B2 | 7/2008 | Haughton et al. | |
| 7,685,896 | B2 | 3/2010 | Taughton et al. | |
| 9,162,195 | B2 | 10/2015 | Haughton et al. | |
| 10,611,654 | B2 | 4/2020 | Goldhardt et al. | |
| 2012/0273593 | A1* | 11/2012 | Clark | A01G 25/00 239/242 |
| 2014/0251881 | A1* | 9/2014 | Duesel, Jr. | C02F 1/048 366/291 |

OTHER PUBLICATIONS

Central Definition & Meaning, Merriam-Webster Online Dictionary, obtained on Jan. 29, 2024 from <https://www.merriam-webster.com/> (Year: 2024).*

\* cited by examiner

*Primary Examiner* — Marc C Howell
*Assistant Examiner* — Patrick M McCarty
(74) *Attorney, Agent, or Firm* — Thomas M. Freiburger

(57) ABSTRACT

A vertical motion mixer has a drive mechanism with two axes of guidance for vertical motion. A reciprocating yoke is fixedly secured to the driving shaft for the mixer, without any guide bearing for the mixer driving shaft. The mixer drive unit is of compact and simplified design with minimal moving parts, and including drive gearing with planetary gears to minimize wear during reciprocating movement.

6 Claims, 9 Drawing Sheets

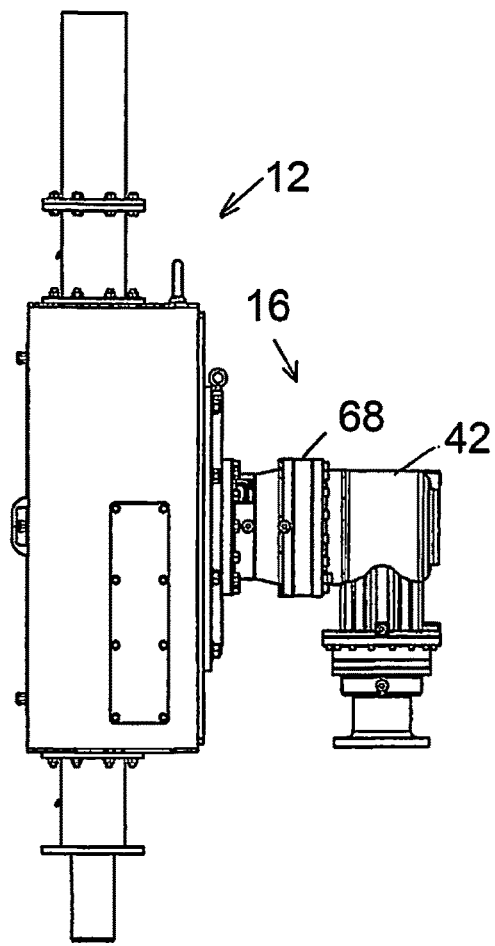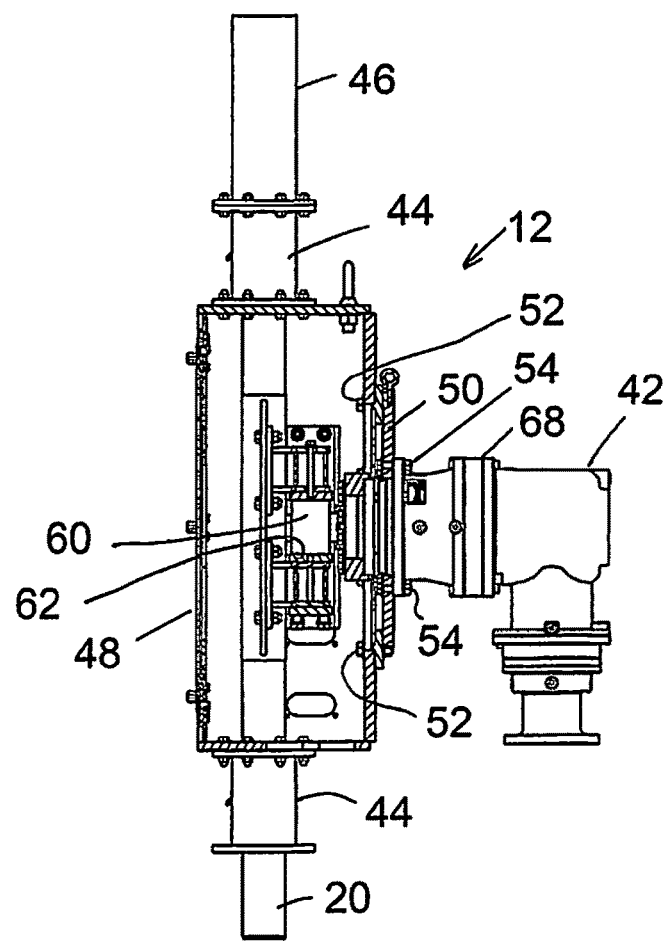
FIG. 4
FIG. 5

VERTICAL MOTION MIXING DRIVE

BACKGROUND OF THE INVENTION

The invention concerns vertical motion mixers, which may be used in wastewater treatment systems or for other purposes. More particularly the invention encompasses an improved vertical motion drive mechanism for driving a mixing disc in reciprocal motion for mixing of liquids or slurries.

In sewage treatment plants, particularly in anaerobic digestion, reciprocating motion mixers are often used, positioned within a liquid/slurry-filled tank so as to drive a mixing disc up and down in reciprocating motion. Typically the stroke of the disc is about 12 to 20 inches. See, for example, prior U.S. Pat. Nos. 10,611,654, 9,162,195, 7,685,896, 7,399,112 and 6,830,369.

Conventional mixing drives for this purpose have not been optimized for mixing efficiency and maintenance requirements. Typical vertical motion mixer drive units have many moving parts and require a great deal of fabrication and maintenance. The driving mechanisms of the mixing units are subjected to considerable wear, particularly in gearing and other moving parts, due to the repeated reversal of direction of the mixing disc, which induces considerable wear in gearing and other components handling rotational and translational movement.

SUMMARY OF THE INVENTION

The current invention reduces moving parts in a vertical motion mixing assembly in a simpler mechanism that endures the cyclical, reverse-direction motions with less wear, as well as minimizing lubrication requirements. The simpler design avoids the use of fixed guide rails that are engaged by rollers or bearing blocks attached to a yoke that moves up and down.

As in prior reciprocating mixer drive mechanisms, the present invention includes a scotch yoke, but the design is optimized and certain maintenance-intensive or otherwise problematic features are eliminated. The guidance for the reciprocating scotch yoke is provided by rods or shafts, vertically oriented, affixed to the scotch yoke and movable together with the yoke in reciprocation. These rods ride in linear bearings fixed to a housing or frame, preferably four such bearings, upper and lower bearings at each of left and right sides of the mechanism. Simple bearings with grease lubrication can be used, although the bearings could include internal rollers. The stroke range for the disc driving shaft preferably is about 12 inches to 20 inches.

Designed to handle over 15 million cycles per year, the design of the invention avoids or eliminates any oil lubricated sliding bearings, employing only grease lubrication. Also, no couplings are required between the mixer shaft and the yoke, whereas typical prior designs have included such couplings, to permit multiple degrees of freedom of the mixer shaft relative to the yoke. In the current invention the mixer shaft preferably is fixed to the yoke, directly below the yoke, with zero degrees of freedom relative to the yoke. In this way, the need for any guiding device for the mixer shaft is eliminated.

The invention utilizes two parallel axes guiding linear motion, rather than three as in prior designs, reducing chances of misalignment in final assembly and simplifying the mechanism.

In a preferred embodiment the linear guide shafts or rods are essentially coplanar with the mixer shaft, or in any event no more than 6 inches displaced, more preferably no more than about 4 inches.

The axis of reciprocating movement of the scotch yoke is essentially in alignment with the mixer shaft, which is optimal in avoiding stresses due to tilt forces inherent in a typical scotch yoke drive.

Another feature of the invention is that the motion of the scotch yoke crank-connected roller is limited to be within the spacing between the centers of the guides. Thus, the scotch yoke roller is never outside the distance between guide centers. This reduces canting forces that tend toward binding, reducing wear.

In another aspect of the invention, gear wear is greatly reduced in this repeatedly reversing mechanism by use of planetary reduction gearing. This can spread the forces, particularly at the point of reversal of direction of the disc, to, for example, three gear engagement facets rather than one.

In another feature, the motor drive, gearing and crank can be quickly and easily removed from the housing of the drive unit. The crank assembly, to which the motor is secured, is connected to the housing via a removable back plate which is secured by a series of bolts at an opening in the back of the housing. On this plate the crank assembly is connected using bolts, so that the crank assembly (with motor) is removable from the housing along with the plate by simply removing the series of bolts securing the back plate to the housing, then pulling the back plate and crank assembly from the rear of the housing.

In the prior art the mixing drive unit was typically secured to a bottom mounting plate, usually extending much deeper horizontally than the depth of the housing itself. In the invention the dimensions of the bottom of the housing are limited to a size defined by the housing itself, i.e. by the collection of mechanical components or a framework on which they are secured. Further the prior designs employed three axes of guidance for yoke movement, including one on the disc drive shaft. With substantial alignment of the disc drive shaft and the scotch yoke, as well as the use of only two guides on parallel guide axes and the scotch yoke moving in essentially the same plane, forces tending to tilt or cant the mechanism are substantially eliminated. The base of the housing can be considerably smaller than in the prior art.

The objective of the invention is to produce a vertical motion mixer drive unit of compact and simplified design, minimizing moving parts, designed to handle over 15 million cycles per year, with minimum lubrication requirements, a mixer shaft fixed to the scotch yoke and with only two parallel axes of guidance for the linear motion rather than three as in prior art, reducing chances of misalignment in the final assembly.

DESCRIPTION OF THE DRAWINGS

FIG. 4 is a detailed side view showing the drive mechanism.

FIG. 5 is a side sectional elevation view showing the driving mechanism with internal components.

DESCRIPTION OF PREFERRED EMBODIMENTS

Figure 1:
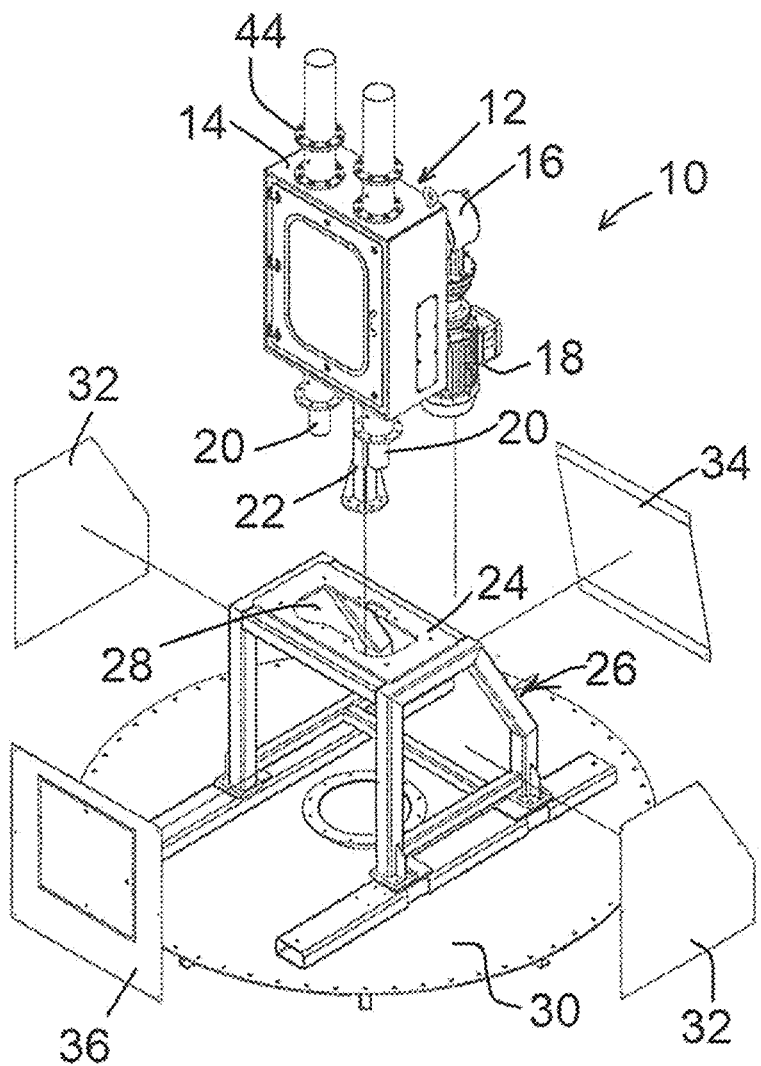
FIG. 1 is an exploded perspective view showing the invention and indicating its application.

In FIG. 1 an assembly 10 is shown, exploded in this view, for a vertical motion drive mechanism which can be secured on a tank containing liquids or slurry to be mixed. In this view the drive mechanism 12 itself is shown with a housing 14, and at the rear of the housing a drive gearing/crank assembly 16 driven by a motor 18. Guide rods or shafts are shown at 20, at left and right of the unit, these rods being movable relative to the housing. A mixer shaft is shown at 22, extending down out of the housing, connected into the driving mechanism. When components are assembled into an assembled structure 10, the housing 14 is seated on an upper surface 24 of a support frame 26, an opening 28 being shown for the movable rods 20 and the mixer shaft 22. The support frame 26 rests on a surface 30, which can be a plate as shown, or which can be the top surface of a tank, such as an anaerobic digester tank in a sewage treatment facility. For this purpose the plunger shaft 22 is extended as at 22a (see FIG. 3), attached to the shaft structure 22 shown in the drawing, and a mixer disc such as shown in the above-cited prior patents is attached at the lower end of such a mixer shaft. Note that the frame 26 is not a necessary part of the invention and the housing can be supported on the tank by other means (the motor 18 need not extend downwardly).

In the drawing side plates are indicated at 32 and 34, removed from the frame 26, and a front plate is shown at 36. These are specific to the illustrated example and optional.

Figure 2:
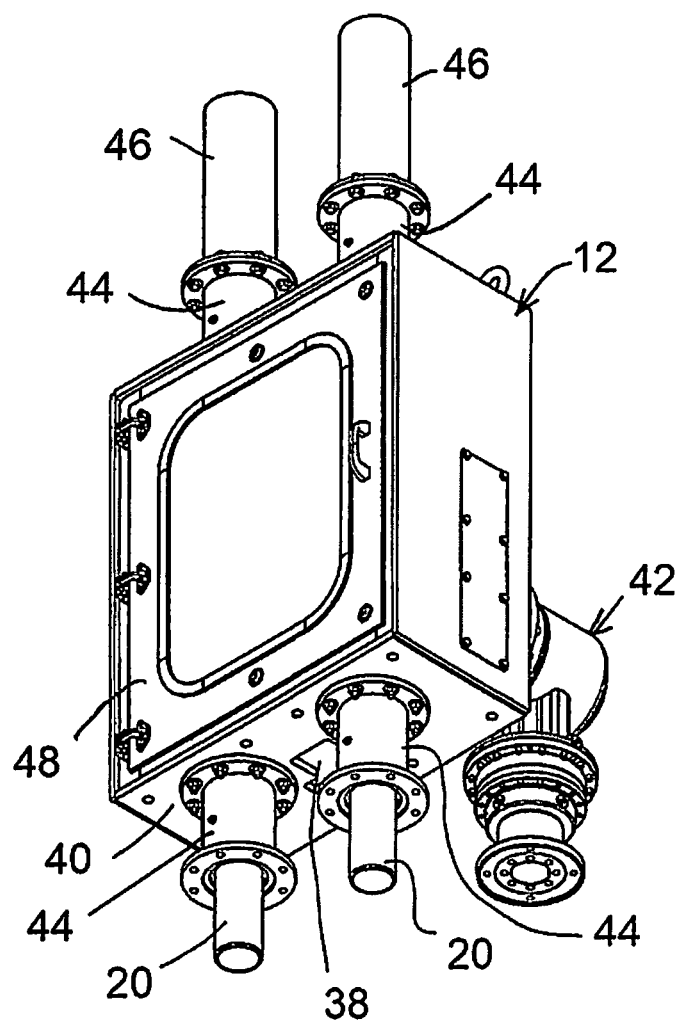
FIG. 2 is a bottom perspective view showing a mixer disc driving assembly of the invention.

Details of the driving mechanism 12 of the invention are shown in FIGS. 2 through 9. In FIG. 2 the driving mechanism 12 is seen in perspective, showing the guide rods or shafts 20 extending out the bottom of the unit. An opening 38 is seen in the bottom 40 of the housing, for extension of the mixer shaft, not shown in FIG. 2. The motor 18 is not shown in FIG. 2, but the drive gearing is indicated at 42, attached to the rear of the housing.

The guide rods or shafts 20 are movable up and down, along with a scotch yoke, described below. These guide rods 20 are slidable in linear bearings 44, secured to that housing at left and right, top and bottom of the drive assembly. At the top of the unit tubular covers 46 can be included above the bearings to cover and protect the reciprocating guide rods 20.

The housing 12 includes an access door 48 at a front side as shown.

Figure 3:
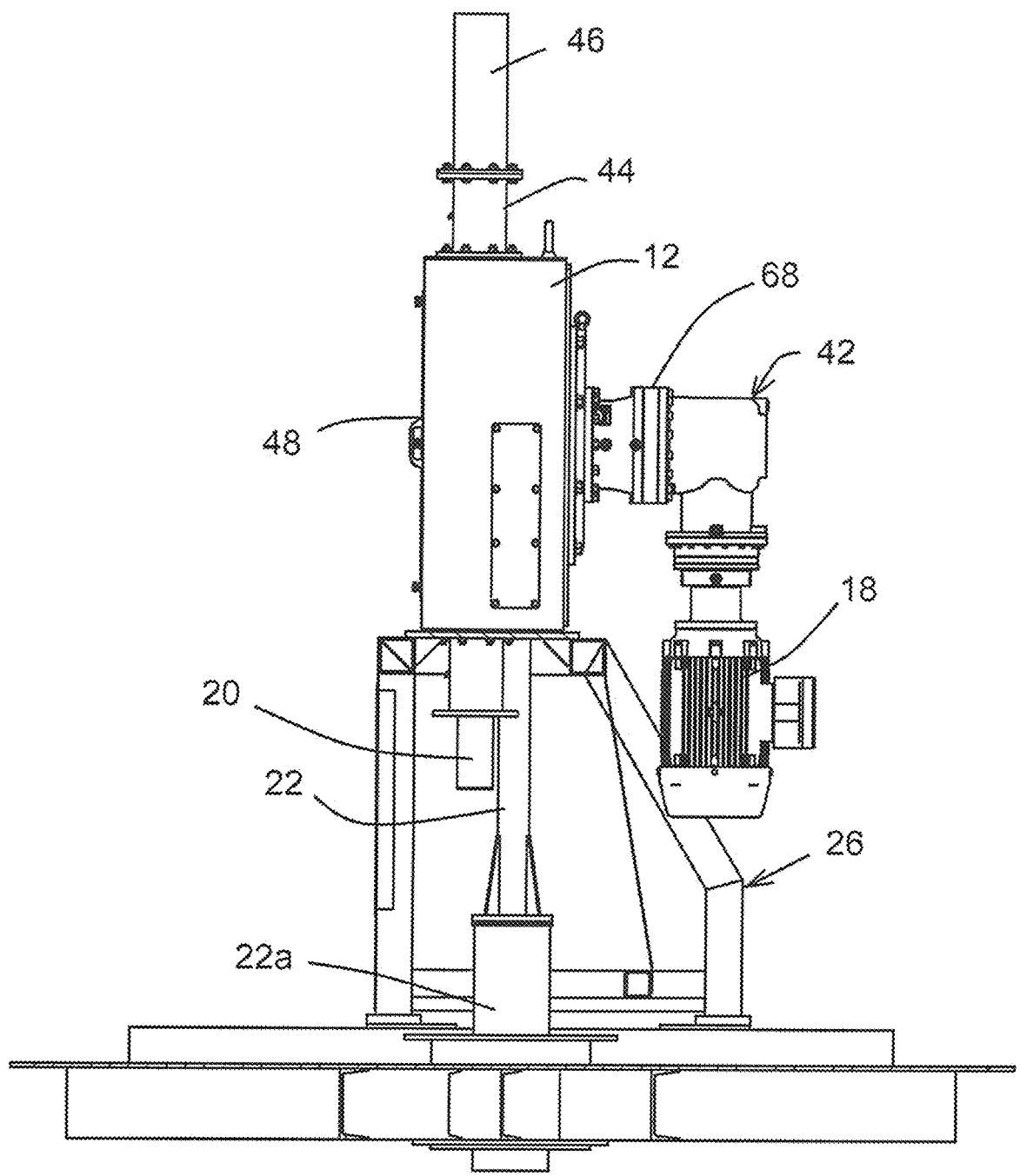
FIG. 3 is a side view showing components of the invention.

FIG. 3 shows the assembly indicated in FIG. 1, in side view. The mixer shaft 22 is shown extending down from the housing 12, and an extension to that mixer shaft will be included when the unit is in service.

Figure 6:
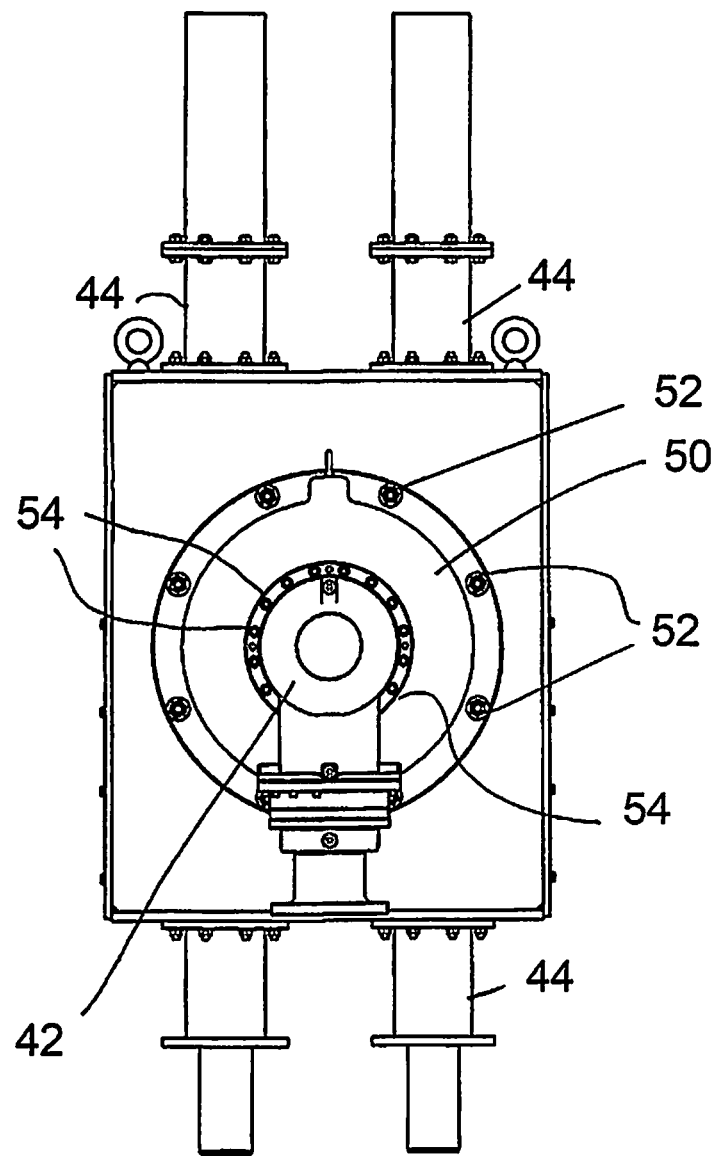
FIG. 6 is a rear elevation view of the drive mechanism.

FIG. 4 is another side elevation view of the driving mechanism, without the motor. FIG. 5 is similar to FIG. 4 but shows some of the internal components within the housing 12. FIG. 5 shows that the mechanical gearing and crank mechanism are secured to the housing 12 in this preferred embodiment via a back plate 50 which can be secured to the housing by a series or ring of bolts 52. Although these could be made accessible from the rear, in the illustrated embodiment the bolts are accessible from the front, via the access door 48. The gearing and crank mechanism is secured to the mounting plate 50 via bolts 54. When the crank/drive mechanism is to be removed from the housing, as for servicing, the bolts 52 can be removed and the mechanism removed from the rear, remaining secured to the plate 50. FIG. 6 also shows the mounting plate 50 with securing bolts 52, as well as the bolts 54 securing the crank assembly to the plate.

Figure 7:
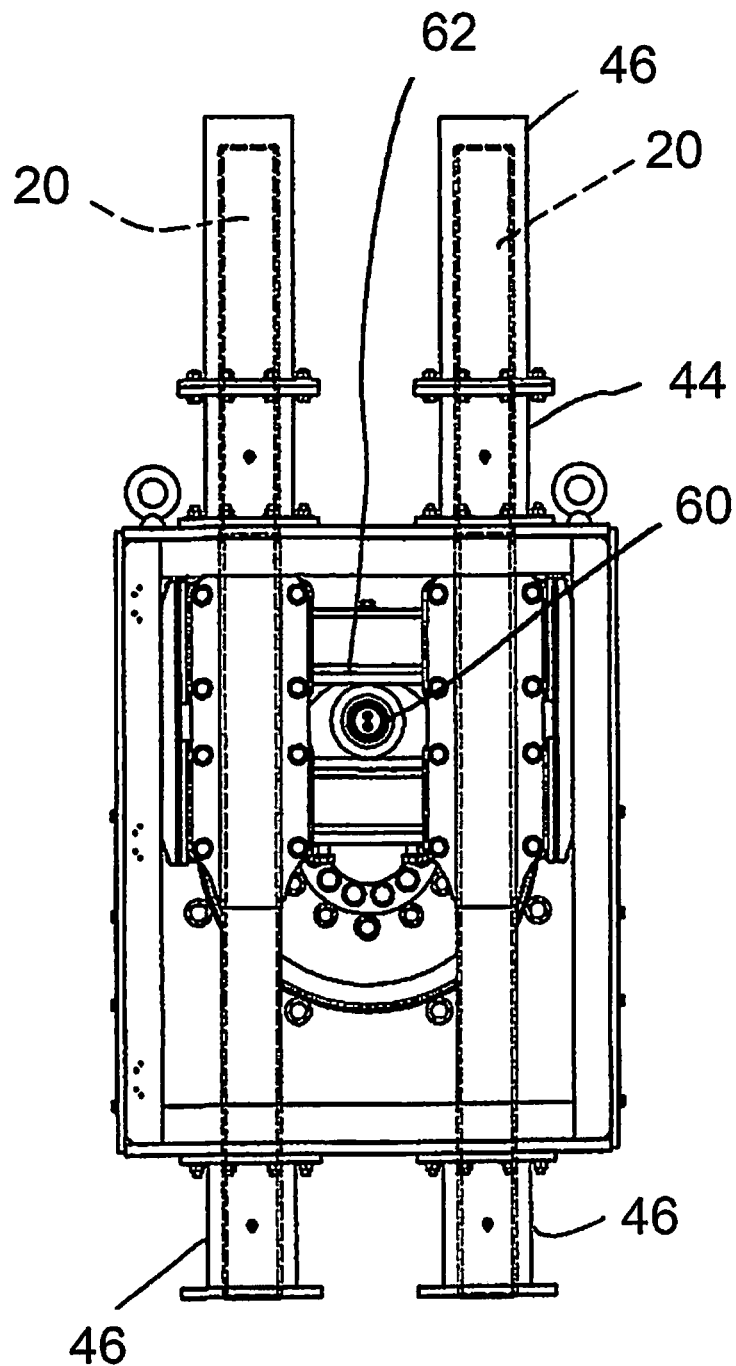
FIGS. 7 and 8 are front views, with front housing cover removed, showing the driving mechanism.
Figure 8:
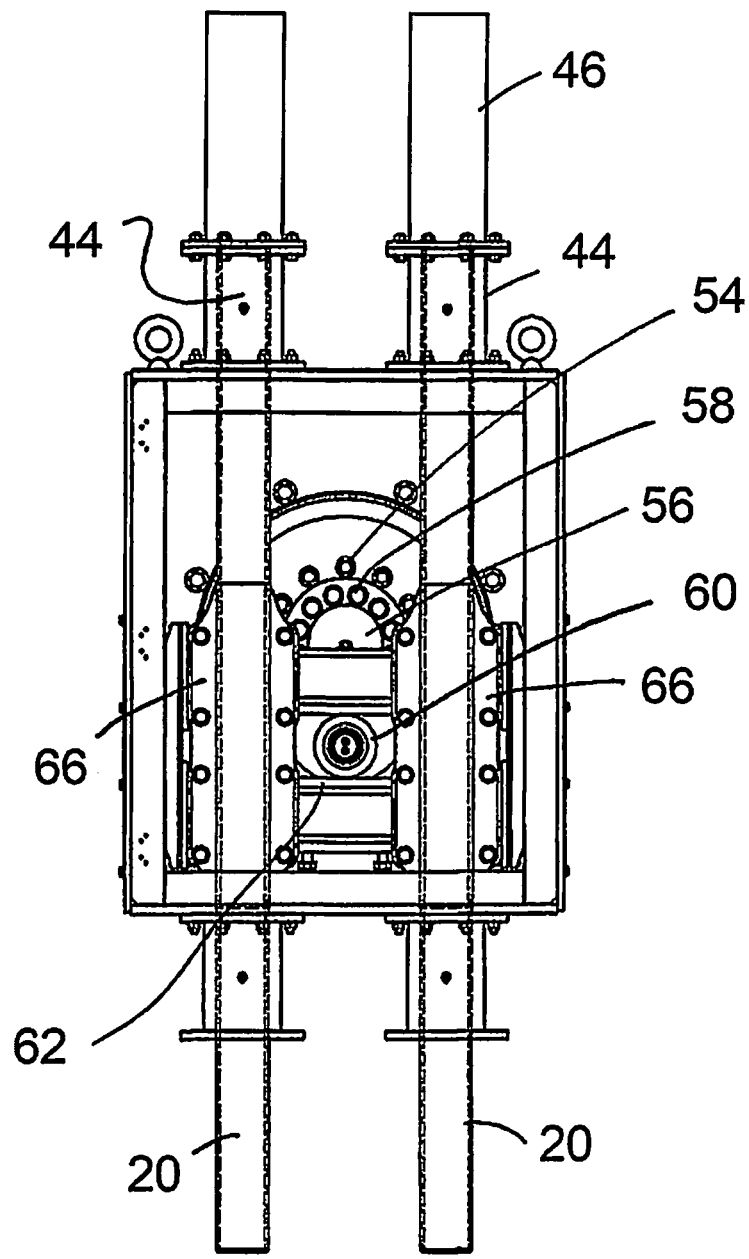
Figure 9:
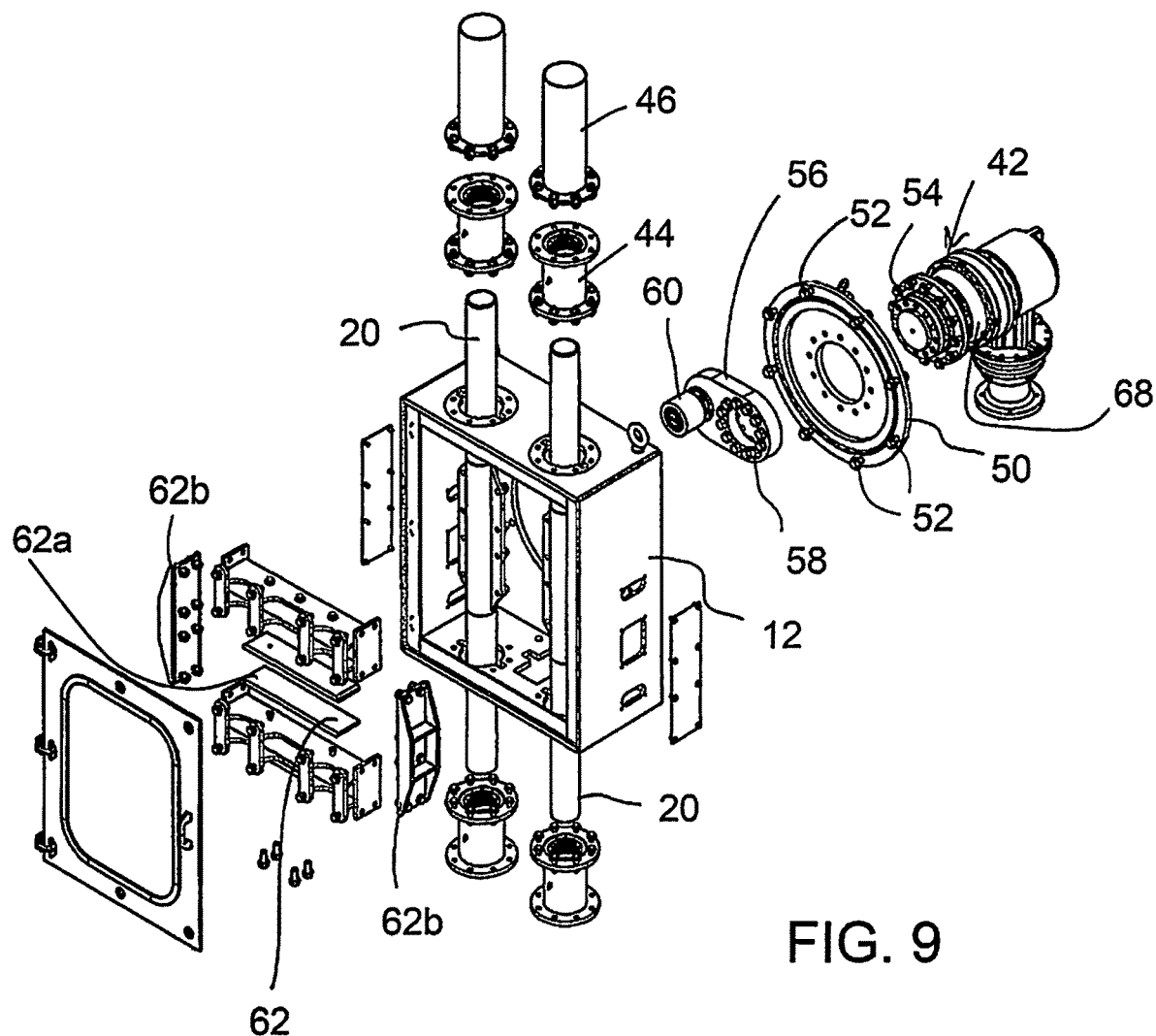
FIG. 9 is an exploded perspective view showing the driving mechanism and indicating its assembly.

FIGS. 7, 8 and 9 show further details of the mechanism. A crank arm 56 shown in FIG. 9 is rotatable by the gearing/crank mechanism 42. As shown, a ring of bolts 58 can secure the crank arm 56 to the mechanism 42. As in prior scotch yoke mechanisms, a yoke roller 60 on the crank drives a movable yoke which can be seen at 62 in FIGS. 7 and 8 and its components indicated at 62 in the exploded view of FIG. 9. In addition, the yoke roller can be seen at 60 in the sectional, assembled view of FIG. 5, engaged within the scotch yoke 62.

The yoke driving roller 60 travels in a circular path, moving the scotch yoke linearly up and down through a predefined stroke cycle, while the roller travels back and forth horizontally within the yoke.

In FIGS. 7 and 8, which show the crank arm 56 and yoke driver roller 60 at the top of the stroke and at the bottom of the stroke, respectively, the yoke 62 itself is not fully shown, some of it being hidden behind rod attachment structure. The exploded view of FIG. 9, however, shows that the yoke has a predefined width and is formed by upper and lower plates 62a and end plates 62b. The yoke track is a rectangular space within which the driving roller 60 fits closely but can move freely.

Important features of the invention are as discussed above. The driving mechanism, including the motor, can be removed easily and efficiently by removing the bolts 52 that retain the mounting plate 50 to the back side of the housing 12. Such removal will include the gearing/crank mechanism 42, the plate 50 and the crank arm 56 with the roller 60, all assembled together and removed from the yoke and from the housing. Another important feature is that the mixer shaft 22 is essentially in the same plane with the two guide rods or shafts 20, preferably no more than about 4 inches out of that plane. In the described embodiment the mixer shaft is slightly aft of those guide rods 20, so that the yoke 62 can define a wider roller path, and it should be no more than 6 inches removed from the plane of the guide rods 20, for a mixer disc with a stroke of about 12 inches to 20 inches.

In addition, as described above, the guide rods 20 are not fixed but are secured rigidly to the yoke 62 and move with the yoke. FIGS. 7, 8 and 9 indicate bolted connection of rod-attached flanges 66 to the end plates 62b of the yoke. Thus, the rods 20, the flanges 66 and the yoke 62 all move together as a unit, up and down relative to the housing, supported in a linear track by the four bearings 44 as shown. Attachment of the yoke to the guide rods 20 can be by other mechanical securing means, or even by welding.

Another important feature, as described above, is the use of planetary reduction gearing. The reduction gearing mechanism is indicated at 68 in FIGS. 3, 4, 5 and 9. The planetary gearing, which may include, for example, three planetary gears engaging with the central driving gear and with an outer ring gear, provide a much greater engagement area for driving the mixing disc through millions of repeated reversals between up and down movement. As such, the planetary gearing spreads the driving forces and reduces wear on the gear surfaces. At each reversal of direction the engaged gear facets are reversed, and the planetary gearing greatly increases the life of the gear assembly.

Another important feature is that the mixer shaft is aligned directly with the motion of the yoke, i.e. the axis of translation movement of the yoke. In this embodiment the mixer shaft is fixed directly to the bottom of the yoke. As explained above, this reduces forces tending to cant or bind the mechanism.

Figure 10:
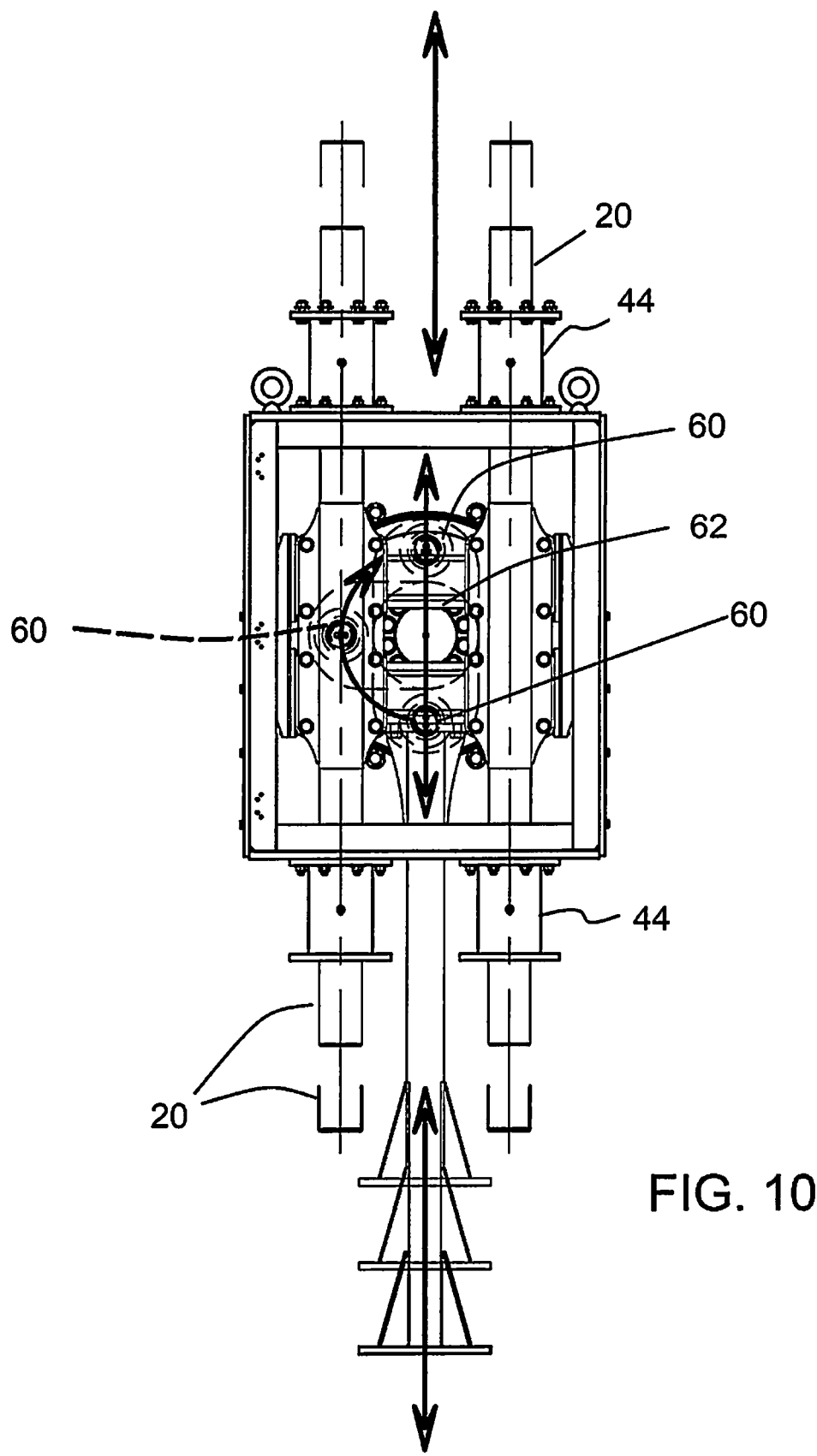
FIG. 10 is a schematic indication showing up/down motion of a scotch yoke and affixed guide rods and disc driving shaft, as driven by a yoke drive roller engaged with the yoke.

FIG. 10 is a schematic representation showing the housing 12 and the front of the unit, indicating three different positions of the yoke 62, which is fixed to he rods 20. These three positions are shown in one view for clarity, although they are successive positions. The yoke is shown at top and bottom of stroke, at which point the yoke driver roller 60 is located centrally. Also shown is the drive roller 60 at extreme left of its travel, within the travel path afforded by the yoke. This is at the middle of the stroke, midway between top and bottom. On the return stroke the yoke driving roller 60 will be at the opposite side. As noted above, a feature of the invention is that the extreme left and right positions of the yoke driving roller are essentially coincident with the guide rods or shafts 20. It is important that the drive roller does not travel significantly outside the space defined between centers of the rods 20, and in this embodiment the limits of travel are directly at the rods 20.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the claims that follow.

We claim:

1. A reciprocating mixer disc assembly for mixing wastewater sludge by cyclical reciprocating motion of the mixer disc within a wastewater digestion treatment tank, with a mixer shaft connected to the mixer disc, comprising:
   a housing,
   a driving mechanism connected to the housing and to the mixer shaft to drive the mixer disc in reciprocating linear motion in the wastewater sludge within the wastewater digestion tank, the driving mechanism including
   a motor-driven crank assembly such that rotation of the crank assembly causes reciprocating linear motion of a yoke driven by the crank assembly, the yoke being within the housing and rigidly attached to the mixer shaft, without any guide structure on the mixer shaft,
   a guide assembly for restraining and guiding the movement of the yoke in linear reciprocation in two opposite directions of movement, the guide assembly including a pair of spaced apart linear guide shafts oriented parallel to said directions of movement, the guide shafts being secured fixedly to the yoke for movement therewith, and bearings fixed to the housing, the guide shafts being in contact with the bearings and slidable with respect to the bearings, the two guide shafts being the only said guide shafts and being on two parallel axes which are the only axes of guidance for yoke movement,
   the bearings being cylindrical, and the guide shafts being cylindrical and circumscribed by the bearings and reciprocating within the bearings, and
   wherein the linear guide shafts define a plane which is offset from the mixer shaft and wherein the plane is offset no more than about four inches from the mixer shaft and the yoke having an axis of reciprocating movement located centrally of the yoke, and said axis of the yoke being aligned with the mixer shaft.

2. The reciprocating mixer disc assembly of claim 1, wherein the bearings are grease-lubricated bearings.

3. The reciprocating mixer disc assembly of claim 1, wherein the yoke is a scotch yoke, with a driving roller on a crank arm of the crank assembly, wherein the driving roller, when at positions farthest from said axis of the yoke, is located at one of the linear guide shafts.

4. The reciprocating mixer disc assembly of claim 1, wherein the yoke is a scotch yoke, with a driving roller on a crank arm of the crank assembly, wherein the driving roller travels on a path limited to a distance from center to center of the two guide shafts.

5. The reciprocating mixer disc assembly of claim 1, wherein the crank assembly comprises planetary gearing to minimize gear wear.

6. The reciprocating mixer disc assembly of claim 1, wherein the crank assembly is secured to the housing via a removable back plate which is secured by bolts at an opening in the housing, and to which the crank assembly is connected by bolts, so that the crank assembly is removable from the housing along with the back plate by removing the bolts securing the back plate and pulling the back plate and crank assembly back from the housing.

* * * * *